Nov. 19, 1946.  W. MELAS ET AL  2,411,330
MEASURING SYSTEM
Filed March 23, 1944  2 Sheets-Sheet 1

INVENTORS
WILLIAM MELAS
JOSEPH RAZEK
BY
C. D. Ehret Atty.

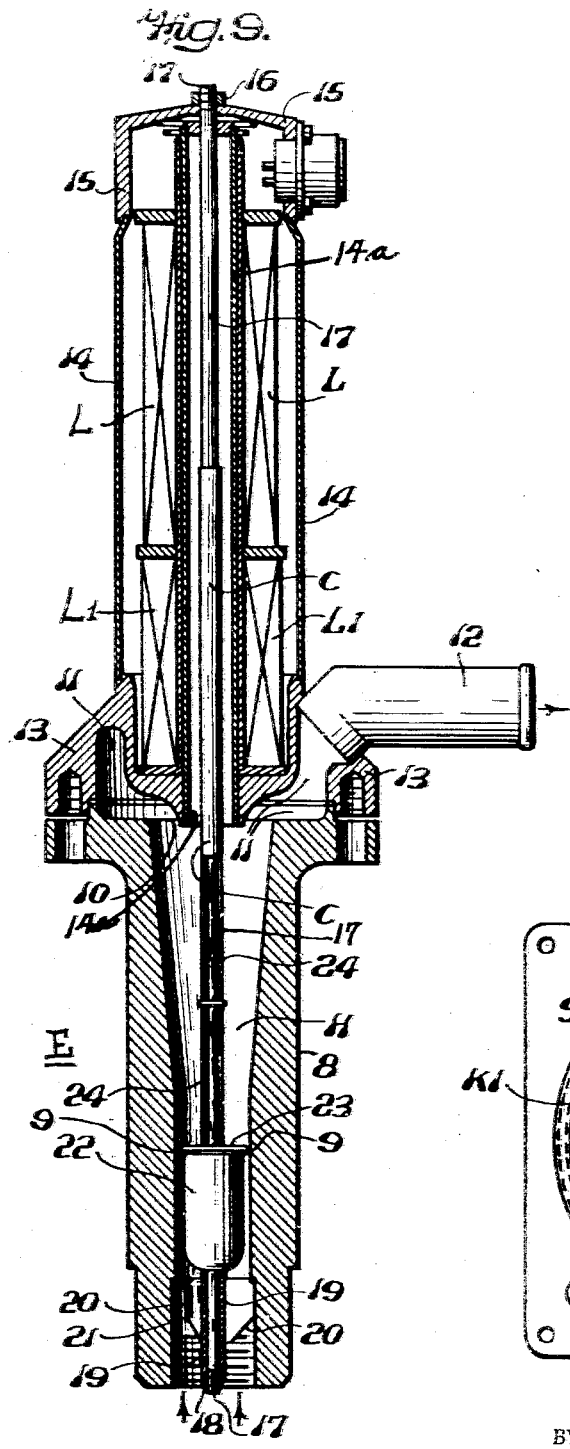
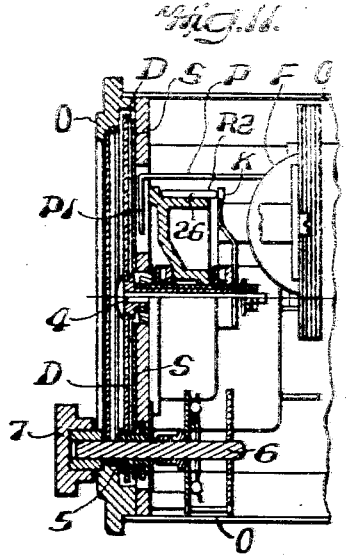
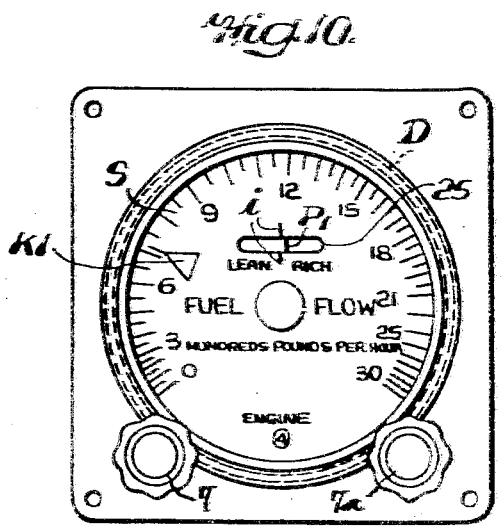

Patented Nov. 19, 1946

2,411,330

UNITED STATES PATENT OFFICE 2,411,330

MEASURING SYSTEM

William Melas, Philadelphia, and Joseph Razek, Llanerch, Pa., assignors, by mesne assignments, to HSB Corporation, a corporation of Pennsylvania Application March 23, 1944, Serial No. 527,786

13 Claims. (Cl. 73—209)

Our invention relates to measuring systems of the type in which a magnetizable core structure is moved in response to changes in magnitude of a condition under measurement correspondingly to vary the relation to each other of the inductances of coils in different branches of a balanceable electrical network; and more particularly relates to differences in characteristics of the coils for rendering the network for certain purposes adaptable for metering or indicating magnitudes of a condition, including rates of flow of fluids, such as fuels in general, including those utilizable for production of motive power for any purpose, and more especially for driving aircraft and other vehicles.

In accordance with our invention, there is provided a balanceable electrical network in different arms or branches whereof are included inductively reactive coils so unlike as to differ from each other, especially in their structural characteristics, and so disposed relative to each other and a therewith coacting magnetic core structure, that the network partakes of certain useful characteristics; and in other arms or branches of the network are disposed impedances, non-reactive or reactive, complemental to the impedances of aforesaid arms, and the relation to each other of whose magnitudes is variable to effect balance of the network; and, more particularly, with a graduated or calibrated scale of a meter, related to the network, there co-operates an index movable in unison with, or in dependence upon the movement of, a member actuated for balancing the network by varying the relations to each other of aforesaid magnitudes of said last-named reactive or non-reactive impedances; further in accordance with our invention a galvanometer which indicates balance of the network also indicates small informative unbalances thereof.

Further in accordance with our invention the markings or calibration divisions of aforesaid meter scale are spread or contracted in different portions or regions of the scale in dependence upon or as predetermined by the effect upon said network of aforesaid differences in the characteristics of aforesaid coils and related core structure.

Our invention resides in measuring systems and apparatus of the character hereinafter described and claimed, and generally exemplified by the particular system hereinafter described.

For an understanding of our invention, reference is to be had to the accompanying drawings, in which:

Fig. 1 is a diagram of a network;

Figs. 2–6 inclusive illustrate various meter scales differing with respect to the spacing of their calibration markings;

Fig. 9 is a vertical sectional view of a unit comprising flow-meter structure associated with a coil-core unit;

Fig. 10 is an elevational view of a meter unit;

Fig. 11 is a vertical sectional view, on larger scale, of a portion of the meter unit shown in Fig. 10; and Fig. 12 is a fragmentary elevational view of parts shown in Fig. 11.

Figure 1:
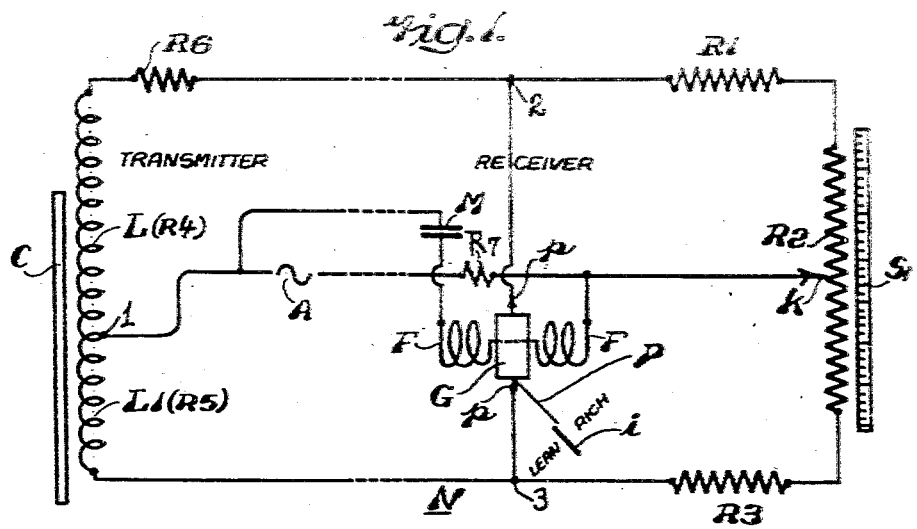

Referring to Fig. 1, the balanceable network N comprises, in different arms thereof, within the portion which is designated "Transmitter," the coils, reactive impedances, L and L1, (whose non-inductive resistances are R4 and R5, respectively) and the co-operating magnetic core structure C; the core structure C (of iron, nickel or other suitable magnetic metal or alloy) usually is the movable member, actuated or moved with respect to the coils in accord with variations of the magnitudes of a condition to be measured to affect the inductances of the coils; for example, as shown in Fig. 9, core structure C is moved vertically with respect to the aligned coils L1 and L by means constituting the responsive element or system of a flow-meter, whereby in response to increases and decreases in the rate of flow of a fluid, the core structure C rises or falls, thereby changing its positional and electromagnetic relation to the coils L1, L.

In other arms of the network are included different portions, as determined by adjustment of contact K, of an impedance R2, which may be reactive but which, by preference, is a non-inductive resistance for rendering the portion of the network marked "Receiver," the meter unit, more compact, a matter of advantage when the system is utilized upon or in the cockpit of an aeroplane, or in analogous situations where utmost compactness is desired.

The impedances R1, R3 and R6 may be non-reactive resistances, provided principally for calibrating the arms of the network in which they are connected.

One of the conjugate conductors extends from 1, the common terminal of neighboring arms (of the network) in which coils L and L1 respectively are connected, to and terminates in aforesaid contact K adjustable along the impedance R2 to effect balance or unbalance of the network by including in different branches thereof different amounts of that impedance. The contact K may serve also as a pointer movable along a scale S1 calibrated in units of rate of flow or in terms of the varying magnitudes of any other condition to be measured. Or, and preferably, with the contact K is associated and movable in unison therewith a pointer or index K1 movable with respect to a stationary scale S in the meter unit, Figs. 10 and 11. A source of alternating current A is connected in series in aforesaid conjugate conductor, preferably in the portion thereof in the "Transmitter"; in the same conductor may be included a generally small resistance R7, to hold at suitably low magnitude the strength of current through the field windings F, F of the galvanometer if that instrument should be of too high sensitivity. In the other conjugate conductor, extending from 2 to 3, is connected the coil G, of aforesaid galvanometer, mounted for rotation upon and about the axis of pivots $p$, $p$, with provision of a spring or equivalent, not shown, which biases the coil G toward and to its position corresponding with and representative of zero current therethrough, indicative of balance of the network or bridge N. The field coils F, F of the galvanometer are connected in series with each other in circuit with source A; and in series with the field coils is connected a condenser M of capacity to bring into phase with each other the current through the galvanometer field coils F, F and the current through deflecting coil G.

Attached to and deflected by galvanometer coil G is an indicating member P, such as a pointer, which coacts with a mark $i$; the network is in balance when the end (P1, Fig. 11) of pointer P is in radial alignment with the mark $i$; for at least small unbalances of the network, P1 will lie on one side or the other of mark $i$, so indicating unbalances informative regarding certain conditions; for example, as indicated in Figs. 1 and 10, whether the amount of gasoline-air mixture delivered to a motor is either "rich" or "lean." Beyond such generally informative indications, the galvanometer deflections are not themselves measures of the magnitudes of the condition to be measured; those magnitudes are measured or predetermined by the positions of contact K along impedance R2.

The current source A may, especially on aircraft, be one utilized also for other purposes including, for example, supply of current for radio apparatus.

The frequency of the alternating current supplied by source A for the general purposes of our invention is not of importance. On aircraft the frequency of that current may be for example 400 cycles per second, as may be required or desirable for any apparatus other than that of the present invention, such as aforesaid radio apparatus.

Figures 7, 8:
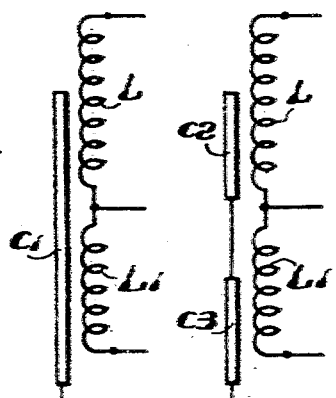
Figs. 7 and 8 are schematic representations of coil-core assemblies, differing from the coil-core assembly of Figs. 1 and 9.

As shown in Figs. 1 and 9, the neighboring ends of coils L and L1 are close to each other. However as indicated in Figs. 7 and 8 these coils may be substantially spaced from each other, axially. Their windings may be of any suitable conductor, of number of turns and distribution thereof longitudinally of each coil to effect suitable or desired inductance thereof; the number of turns of the coil L1 per unit of length thereof may be uniform, or, preferably, greatest at or adjacent, or increasing in approaching, its end which is nearest the associated coil L.

In Fig. 7 the magnetic core structure C1 may be unitary or, as in Fig. 8, it may comprise two separate core elements or members C2 and C3 spaced from each other but mechanically connected for movement in unison under control of the flow-meter, Fig. 9, or other device responsive to the magnitudes of the condition under measurement.

In general the inductances of the coils L and L1 are or may be substantially equal. When the frequency of the current supplied by source A (whose voltage, for example, may be 24 volts) is 400 cycles per second, an inductance of each of the coils L and L1 of the order of 0.1 henry is satisfactory, but may be of any other suitable magnitude; and the non-inductive resistances of those coils may be equal or substantially so, and of the order, for example, of about 85 to 90 ohms—R5 of coil L1—and, in the case of coil L, its non-inductive resistance, R4, plus the resistance R6 (if needed for the purpose of rendering substantially equal the non-inductive resistances of the neighboring bridge arms) may be of about the same order, about 85 or 90 ohms. In the receiver the resistance R1 may be of the order of about 50 or 55 ohms; R2 of the order of about 205 or 210 ohms; and R3 of the order of about 35 ohms.

In accord with this invention the coils L and L1, whether closely positioned as in Figs. 1 and 9 or spaced from each other as in Figs. 7 and 8, differ substantially from each other in length, as to an extent connoted by the fact their lengths may, for example, be about 4½ inches and 2½ inches, respectively. The length of the coacting core structure and its length of travel are related to the coils of different lengths and their relative positions; for example, the length of core C or C1, or the length from the top of core element C2 to the bottom of element C3, Fig. 8, may be about 5 inches, and length of its travel about 4 inches.

Core C, Figs. 1 and 9, and in like general sense the core C1 of Fig. 7 and composite core unit C2—C3 of Fig. 8, is longer than the coil L1 and long enough such that in its uppermost position the lower portion of the core structure is still preferably well within the lower coil L1, as within a portion thereof having aforesaid greater or greatest number of turns per unit of length.

The core structure, unitary or composite, preferably is longer than the longer of the coils, whereby, as hereinafter noted, there always shall be some portion of the core structure, whatever its length of travel, simultaneously within both coils. And the length of the core structure and its length of travel are dependent upon or are determined by what shall be the total length of the scale (whether straight, as in Fig. 1, or arcuate as in Figs. 3–6 inclusive and Fig. 10); or, conversely, the length of the core structure and its length of travel determine what shall be the total length of such scale, whether straight or arcuate.

Upon the lengths or relative lengths of the coils L and L1, and upon the length and travel of their associated core structure, and upon the reactances or relative reactances of the impedances of the adjacent bridge or network arms in which the inductances of coils L and L1 are respectively connected and effective, depends the "openness" of the scale, i. e., the magnitudes of the spacing, between the scale markings, per unit, or per equal number of units, of the magnitude of the condition to be measured; and the uniformity of the scale, in the sense of degree of equality of scale-mark spacings is dependent upon the same factors. Change in any of those factors, or change in the relation of any one or two with respect to the others or other, will modify the openness of the scale and/or the position between the ends of the scale of the region of its greatest openness.

Figure 2:
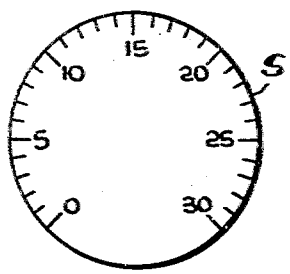

Fig. 2 illustrates a scale, of any arcuate length, for example about 270°, which is practically uniform with respect to the scale divisions at both end regions as well as in the middle region. Such uniformity would obtain were the coils L and L1 of equal lengths, accompanied by suitable length of the core structure co-operating therewith. In contrast with the uniformity of the scale of Fig. 2, the scales of Figs. 3, 4 to 6 inclusive and 10 in accord with our invention are purposely not uniform, so rendered because coils L and L1 are of different lengths, as herein described in connection with their co-operating core structure. Where, however, as in the case of precise control of rate of flow of fluid to an aeroplane motor, or under analogous circumstances, uniformity of the scale throughout its length is not indispensible, there may be substantial departure from such uniformity, while procuring sufficient uniformity throughout a relatively large arcuate portion or region of the scale, for example about ⅓ of its total length, in which there is preserved sufficient uniformity, with, more importantly, increased openness or expansion affording high accuracy. In brief, by our coils L and L1 of substantially different lengths and their related core structure and its length of travel, importantly greater precision is made possible in predetermining or measuring magnitudes of a condition within at least any desired large portion of the entire range of such magnitudes.

In Fig. 10 the region of expansion or accentuated openness of scale is the mid portion or section thereof, the magnitudes within which are those of vital or greatest importance to a pilot or the operator; in the end sections of the scale, to either side of the mid-section there is less openness, in the sense the scale markings are relatively more, but harmlessly, compressed.

Figure 3:
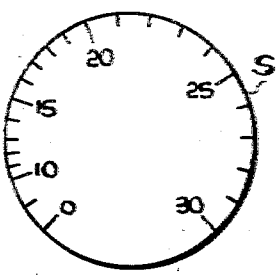

In Fig. 3 the scale markings are close or relatively compressed at the low magnitude or left end, and their spacings progressively increase to the right end where the scale is most expanded.

Figure 4:
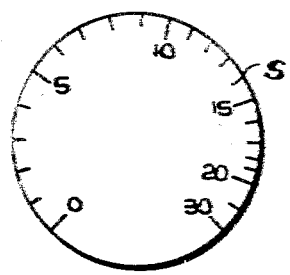

Fig. 4 represents a situation the reverse of Fig. 3, in the sense the scale is of greatest expansion at the low magnitude or lower left, and become progressively more compressed to the other or high reading end of the scale.

Figure 5:
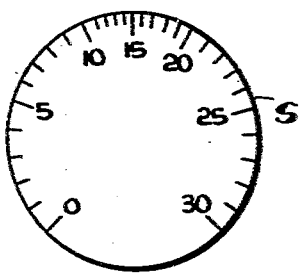

Fig. 5 represents a scale in which the mid-region or section is compressed, while in both end sections the scale markings are widely spaced from each other.

Figure 6:
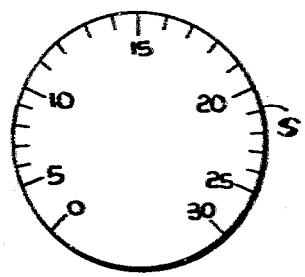

Fig. 6 illustrates a type of scale procurable by coil spacing and core structures illustrated in Figs. 7 or 8; it corresponds in general character with scale S of Fig. 10.

Fig. 9 illustrates an example of application of our invention as applied, for example, to measuring or predetermining rates of flow of a liquid; it comprises the lower metal housing unit 8, of the flow meter unit E, having the conical upwardly divergent passage H extending from approximately the region or point 9 to approximately the point or region 10 where it opens into and communicates with the space 11 with which is connected the discharge pipe 12, which delivers the liquid to destination, as to an aeroplane propelling means, such as an internal combustion motor, or for jet propulsion. Secured to the upper end of member 8 is the metal member 13, in which is provided at least a large part of aforesaid cavity 11. Upon the member 13 is disposed a tubular housing member 14 which may be of metal and in any event of such metal or material and dimensions (especially thickness) as will prevent or minimize production therein of eddy currents due to the stray alternating magnetic fields produced by the coils. Member 14 is surmounted by the cap 15 upon which engages a nut 16 threaded upon the upper end of the guide rod 17 on which is vertically movable the tubular magnetic core C movable axially of the solenoids or coils L and L1. To prevent affecting the accuracy or sensitivity of the flow-meter, or the like, core C is as light in weight as possible consistent with its effective coaction with the coils. The coils surround tubular non-conducting member 14a, which extends in and to the bottom of member 13. The fixed guide rod 17 continues down beyond member 14a through the chamber H, and on whose lower end is threaded nut 18 which holds in place a sleeve 19 through which the guide rod 17 extends, and upon which are disposed radially extending vanes 20 for centering sleeve 19 in chamber 21, in the lower end of housing 8. The mouth of chamber 21 is provided with pipe threads to receive the threaded end of a pipe which delivers the liquid in question into member 8 at rate determined by manually or automatically controlled throttle or the like in advance of the discharge into chamber 21 and/or subsequent to discharge from member 12. Resting upon the fixed sleeve member 19 is the hollow movable member 22, sometimes termed a "top" or "sinker," closed at its bottom, and sealed at its top by the member 23 having a downwardly and outwardly tapered circumference coming to a sharp circular edge at or near the level 9, the portion of smallest diameter of the divergent passage H. The core structure, such as C, or other core structure herein referred to, is attached to the member 23 through the medium of an open cage 24, of non-magnetizable material or metal, loosely fitting or disposed about non-magnetizable guide rod 17.

The liquid flows upwardly through passage H, into space 11 and thence through conduit 12. In so doing the member 22 rises and comes to a position, above its illustrated position, of equilibrium for each of the rates of flow in the range for which the structure is designed and suited. For each of the positions of equilibrium of member 22, the core structure C takes a definite position with respect to coils L1 and L, throughout the range of movement of member 22 whose uppermost limit is adjacent the level 10.

With flow metering means of the particular character described, the extents of vertical movement of member 22 and core C are a linear function of, directly proportional to, the magnitudes of rate of flow; our invention also comprehends, however, means responsive to changes in magnitude of a condition which are not a linear function of the movements of the core structure. In either case each change in core position is accompanied by a change in the ratio to each other of the inductances of the coils.

In consequence of the difference between the lengths of the coils L and L1, notwithstanding their inductances may be equal, and the resistances (including the resistances of the coils) of neighboring arms of the network N are equal, the scales, Figs. 3-6 inclusive and Fig. 10, are, in contrast with the uniform scale of Fig. 2, non-uniform and in a chosen section or sections expanded, as hereinbefore noted; so making it possible, particularly because of the difference in the lengths of the coils L and L1, whether abutting each other as in Figs. 1 and 9 or spaced from each other as in Figs. 7 and 8, to effect maximum openness or expansion of the scale at any region or regions thereof necessary for higher or vital accuracy in metering and for vital or high precision in reading of the scale, as may be appropriate or required for different needs or circumstances dependent upon the nature and purposes of various measuring systems whatever the nature and characteristics of their means responsive to changes in magnitude of the condition to be measured.

In aircraft operation, for example, the rate of consumption of fuel is of great importance and must be precisely set or predetermined, and must be precisely measurable. To such end it is important there be expansion of that section of the scale which includes the most important range of rate of supply or consumption of the motor fuel; for example, the expanded scale section may include those magnitudes of rate of flow as correspond with the "cruising-rate" requirement or consumption of fuel.

The metering unit, Figs. 10–12, may comprise, in effect, the "receiver" of the telemetric system of Fig. 1. It may be placed wherever desired; for aircraft it may be mounted, as upon an instrument board, in the cockpit of an aeroplane, within view of the pilot or that member of the crew whose duties include predetermining or measuring with high precision the rate of flow of fuel to a motor or the like.

When there are two or more apparatus, as two or more propelling motors on an aeroplane, there may be provided a "transmitter," Fig. 1 or 9, for each such apparatus, with provision of switching means, operable by knob 7a, Fig. 10, for bringing anyone of the transmitters into relation with the "receiver," Figs. 1, 10 and 11, common to them all, preferably with utilization of the source of current A in common.

In the receiver unit, within a casing or housing 0, if desired and as shown in Figs. 10 and 11, is mounted the galvanometer, upper right of Fig. 11, the impedance R2 and its coacting contact K, the scale S, and the index K1, Fig. 10, which moves in unison with contact K.

The scale plate or card S is held in fixed position; as indicated in Fig. 10 it is provided with an elongated opening 25 through which the end P1 of galvanometer pointer P is visible through the glass or other transparent disk D, disposed in front (to the left) of scale S, Fig. 11. Upon the scale card S, at opening 25, is the mark i, i, and at either side thereof may be placed any suitable legend; in the present instance, "Lean" or "Rich," whereby the operator, when the network N is somewhat out of balance, as indicated by departure of the end P1 of the pointer P from alignment with i, i, is informed of an operating condition, such as the leanness or richness of the gasoline-air mixture delivered from a carburetor to a motor.

The transparent disk D is mounted upon shaft 4, and is rotatable by the member 5, of rubber or other suitable material producing sufficient friction with the edge of disk D (Fig. 12) and mounted upon and driven by the shaft 6 manually rotatable by knob 7. Rotation of member D effects adjustment with respect to scale S of the index K1, Fig. 10, etched upon or otherwise affixed to or adjustable to any desired fixed position with respect to disk D. On a stationary circular or cylindrical form 26, concentric with the axis of disk D, Fig. 11, is wound the conductor, such as resistance wire, which constitutes the impedance R2, Fig. 1; bearing upon that conductor R2, and mounted upon shaft 4, which is driven through disk D rotated by member 5, is contact K, in unison with which rotates index K1 coacting with scale S; accordingly manipulation of knob 7 rotates both the contact K with respect to impedance R2 on form 26, and index K1, on member D, with respect to scale S; member D and contact K are so rotatable through an arc preferably at least sufficient to correspond with the entire arcuate length, e. g., about 270°, of the scale S; the length of that arc may be greater or less than 270°, and is dependent upon the length of travel of the core structure. In consequence the operator may choose or predetermine a rate of flow of the liquid discharged from member 12, Fig. 9, and by knob 7 set the index K1, Fig. 10, to that reading of the scale corresponding with such desired rate of flow; he may then by throttle increase or decrease the rate of flow of the liquid, for example gasoline to an aeroplane motor, until the network N becomes balanced, as will be indicated, Fig. 10, by coincidence of pointer element P1 with the mark i, i; and having so predetermined the rate of flow by setting of index K1, if that rate for any cause should increase slightly or decrease slightly, it will become apparent by the slight unbalance of the network N as evidenced by departure of element P1 from exact register with mark i, i, whereupon the operator then may slightly adjust a throttle or equivalent to bring the rate of flow exactly to the predetermined magnitude.

Or, and in general, an unknown rate of flow, or any other magnitude of a condition, when not preset or known as above described, may be measured by rotating knob 7 to that position which balances the network, and the rate of flow read on scale S opposite to index K1.

In general, the length of the core structure (unitary as in Figs. 1, 7 and 9, or composite as in Fig. 8) with respect to the lengths of the coils is such that there is always, throughout the range of travel of the core structure, some portion of the core structure simultaneously within both of the coils L and L1; otherwise there would occur a reversal of phase as between the currents through the field windings F, F and the coil G of the galvanometer, with result the balance of the network attained under such condition would give an entirely erroneous scale reading; and, importantly, unless there always be some portion of the core structure simultaneously within both of the coils L, L1, as aforesaid, the scales of Figs. 3, 4, 5, 6 and 10 would be unsuitable, in the sense that the ends thereof corresponding respectively with zero or other low magnitude of the condition and the upper end of the scale, corresponding with maximum magnitude of the condition, would, to be useful, have to be relatively reversed or interchanged; which means that with the readings increasing in all said figures in clockwise direction, the scale card in the meter, either as indicated in Fig. 1, or in Figs. 10 and 11, would be wholly erroneous.

Aside from the foregoing, however, by relating the length of the core structure to the length of its travel in such way that, as aforesaid, there is always some portion of the core structure simultaneously within both coils L, L1, it is possible, because the coils are of unequal length, to change in any selected or desired portion or portions of the total length or range of the scale the expansion or compression of the scale markings. In Fig. 10 the mid-section has been expanded or opened, because of the aforesaid relations, while both end regions or sections of the scale have become more compressed. Such inequality of lengths of the coils, having the effect of varying, in response to the core movement, the ratio of the impedances in those arms of the network including the coils, makes possible non-proportionality of the movements of the contact K to the concurrent ratios of the inductances of the coils. Accordingly, the scales S may, by application of aforesaid principle, be modified, as may be suitable or desired, from uniformity such as indicated in Fig. 2, to be non-uniform (in any of the respects and to any extents, generically exemplified by Figs. 3–6 and 10) and to be expanded or compressed in any desired section or sections.

By increasing the length of coil L with respect to the length of Ll, in Figs. 1, 7, 8 and 9, the scale will have the characteristic generically indicated by Fig. 3 which is open or expanded at the high reading end and compressed at the other end.

Reversing the positions of the coils L and Ll, from the relation indicated in Fig. 9, i. e., by placing the longer coil L at the bottom and the shorter coil Ll above it, there is produced on the scale S great expansion at the lower reading end, Fig. 4, with crowding or compression at the higher reading end.

What we claim is:

1. A measuring system comprising a network, inductance coils of different lengths connected, respectively, in different arms of the network, core structure movable with respect to said coils in response to changes in magnitude of a condition, a source of alternating current in a conjugate conductor of the network, means connected in another conjugate conductor of the network for indicating balance thereof, impedances connected respectively in different further arms of the network, contact structure engaging said impedances for adjusting the relative magnitudes thereof for balancing the network, a scale which is non-uniform in dependence upon the difference between the lengths of said coils, and an index movable with said impedance-adjusting contact structure and with respect to said scale for evaluating the magnitudes of said condition.

2. A measuring system comprising a network, substantially axially spaced inductance coils of different lengths connected, respectively, in different arms of the network, core structure movable with respect to said coils in response to changes in magnitude of a condition, a source of alternating current in a conjugate conductor of the network, means connected in another conjugate conductor of the network for indicating balance thereof, impedances connected respectively in different further arms of the network, contact structure engaging said impedances for adjusting the relative magnitudes thereof for balancing the network, a scale having a portion expanded in dependence upon aforesaid different coil lengths, and an index movable with said impedance-adjusting contact structure and with respect to said scale for evaluating the magnitudes of said condition.

3. A measuring system comprising a network, coils of substantially equal inductances and of different lengths connected, respectively, in different arms of the network, said arms having substantially equal resistances, core structure movable with respect to said coils in response to changes in magnitude of a condition, a source of alternating current in a conjugate conductor of the network, means connected in another conjugate conductor of the network for indicating balance thereof, impedances connected respectively in different further arms of the network, contact structure engaging said impedances for adjusting the relative magnitudes thereof for balancing the network, a scale which is non-uniform in dependence upon the difference between the lengths of said coils, and an index movable with said impedance-adjusting contact structure and with respect to said scale for evaluating the magnitudes of said condition.

4. A measuring system comprising a network, inductance coils of different lengths connected, respectively, in different arms of the network, core structure movable with respect to said coils in response to changes in magnitude of a condition, a source of alternating current in a conjugate conductor of the network, means connected in another conjugate conductor of the network for indicating balance of the network, impedances connected respectively in different further arms of the network, contact structure engaging said impedances for adjusting the relative magnitudes thereof for balancing the network, a scale and an index movable, in unison with said contact structure, along said scale, distances unequal, in dependence upon aforesaid different coil lengths, per unit change in the magnitude of said condition.

5. A measuring system comprising a network, inductance coils of different lengths connected, respectively, in different arms of the network, core structure movable with respect to said coils in response to changes in magnitude of a condition, a source of alternating current in a conjugate conductor of the network, means connected in another conjugate conductor of the network for indicating balance thereof, impedances connected respectively in different further arms of the network, contact structure engaging said impedances for adjusting the relative magnitudes thereof for balancing the network, a non-uniform scale whose length is dependent upon the length of travel of said core structure, and a section whereof is expanded in dependence upon aforesaid different coil lengths, and an index movable with said impedance-adjusting contact structure and with respect to said scale for evaluating the magnitudes of said condition.

6. A measuring system comprising a network, inductance coils of different lengths connected, respectively, in different arms of the network, core structure movable with respect to said coils in response to changes in magnitude of a condition, a source of alternating current in a conjugate conductor of the network, means connected in another conjugate conductor of the network for indicating balance thereof, impedances connected respectively in different further arms of the network, contact structure engaging said impedances for adjusting the relative magnitudes thereof for balancing the network, a scale having, in dependence upon the difference in length of said coils, a section which is expanded, and having to both sides thereof sections which are compressed, and an index movable with said impedance-adjusting contact structure and with respect to said scale for evaluating the magnitudes of said condition.

7. A measuring system comprising a network, inductance coils of different lengths connected, respectively, in different arms of the network, core structure movable with respect to said coils in response to changes in magnitude of a condition, a source of alternating current in a conjugate conductor of the network, means connected in another conjugate conductor of the network for indicating balance thereof, impedances connected respectively in different further arms of the network, contact structure engaging said impedances for adjusting the relative magnitudes thereof for balancing the network, a scale the spacing of whose markings, in dependence upon aforesaid difference between lengths of coils, progressively decreases from one end thereof to the other, and an index movable with said impedance-adjusting contact structure and with respect to said scale for evaluating the magnitudes of said condition.

8. A measuring unit comprising a fixed scale, a transparent disk through which the scale is readable, an index carried by said disk and coacting with said scale, a measuring circuit, a deflecting meter in said circuit, a pointer deflected by said meter, said scale having a mark with respect to which said pointer deflects, an impedance included in said circuit, a contact adjustable along said impedance for determining the deflection of said pointer, and a manually operable member for rotating said disk and said contact in unison.

9. A measuring unit comprising a fixed scale, a transparent disk through which the scale is readable, an index carried by said disk and coacting with said scale, a measuring circuit, a deflecting meter in said circuit, a pointer deflected by said meter, said scale having a mark with respect to which said pointer deflects, an impedance included in said circuit, a contact adjustable along said impedance for determining the deflection of said pointer, said scale having an aperture through which and said disk the pointer is visible, and manually operable means for rotating said disk and adjusting said contact in unison.

10. A measuring system comprising a network, coils whose inductances are substantially equal and of different lengths connected, respectively, in different arms of the network, said arms having substantially equal resistances, a core structure of substantially uniform cross section movable with respect to said coils in response to changes in magnitude of a condition, a source of alternating current in a conjugate conductor of the network, means connected in another conjugate conductor of the network for indicating balance thereof, impedances connected respectively in different further arms of the network, manually operable contact structure engaging said impedances for adjusting the relative magnitudes thereof for controlling balance of the network, a scale, representative of said magnitudes of said condition, which is non-uniform in dependence upon the difference between the lengths of said coils, and an index moved in unison with said contact structure and with respect to said scale for evaluating the magnitudes of said condition.

11. A measuring system comprising a network, inductance coils of different lengths connected, respectively, in different arms of the network, a movable core structure whose movements with respect to said coils, in response to changes in magnitude of a condition, are proportional to said changes in magnitude of said condition, a source of alternating current in a conjugate conductor of the network, means connected in another conjugate conductor of the network for indicating balance thereof, impedances connected respectively in different further arms of the network, manually operable contact structure engaging said impedances for adjusting the relative magnitudes thereof for controlling balance of the network, a scale, representative of said magnitudes of said condition, which is non-uniform in dependence upon the difference between the lengths of said coils, and an index moved in unison with said contact structure and relatively to said scale for evaluating the magnitudes of said condition.

12. A measuring system comprising a network, inductance coils of different lengths connected, respectively, in different arms of the network, a core structure movable with respect to said coils in response to changes in magnitude of a condition, a source of alternating current in a conjugate conductor of the network, means connected in another conjugate conductor of the network for indicating balance thereof, impedances connected respectively in different further arms of the network, a manually operable member for adjusting the relative magnitudes of said impedances for balancing the network, a fixed scale representative of said magnitudes of a condition and associated with said manually operable adjusting member, a second member having an index which coacts with said scale, said balance-indicating means having a pointer deflecting with respect to a mark on said scale, and manually operable means for actuating said second member and said impedance adjusting means in unison.

13. A system for determining rate of flow of a fluid comprising a network, inductance coils of different lengths connected, respectively, in different arms of the network, means responding to change in the rate of flow of a fluid by movement of extent proportional to said change, core structure moved with respect to said coils in accord with the movement of said means, a source of alternating current in a conjugate conductor of the network, means connected in another conjugate conductor of the network for indicating balance thereof, impedances connected respectively in different further arms of the network, manually operable contact structure engaging said impedances for adjusting the relative magnitudes thereof for controlling balance of the network, a scale, representative of the magnitudes of rate of flow, which is non-uniform in dependence upon the difference between the lengths of said coils, and an index moved in unison with said contact structure and relatively to said scale for evaluating the magnitudes of said condition.

WILLIAM MELAS.
JOSEPH RAZEK.